(12) United States Patent
Skaland et al.

(10) Patent No.: US 11,846,000 B2
(45) Date of Patent: Dec. 19, 2023

(54) CAST IRON INOCULANT AND METHOD FOR PRODUCTION OF CAST IRON INOCULANT

(71) Applicant: ELKEM ASA, Oslo (NO)

(72) Inventors: Torbjorn Skaland, Kristiansand (NO); Emmanuelle Ott, Oslo (NO)

(73) Assignee: ELKEM ASA, Oslo (NO)

( * ) Notice: Subject to any disclaimer, the term of this patent is extended or adjusted under 35 U.S.C. 154(b) by 607 days.

(21) Appl. No.: 16/314,152

(22) PCT Filed: Jun. 29, 2017

(86) PCT No.: PCT/NO2017/050174
§ 371 (c)(1),
(2) Date: Dec. 28, 2018

(87) PCT Pub. No.: WO2018/004356
PCT Pub. Date: Jan. 4, 2018

(65) Prior Publication Data
US 2019/0203308 A1    Jul. 4, 2019

(30) Foreign Application Priority Data

Jun. 30, 2016  (NO) .................................. 20161094

(51) Int. Cl.
*C21C 1/10*    (2006.01)
*C22C 37/10*   (2006.01)
(Continued)

(52) U.S. Cl.
CPC ............... *C21C 1/105* (2013.01); *C21C 1/10* (2013.01); *C22C 28/00* (2013.01); *C22C 30/00* (2013.01);
(Continued)

(58) Field of Classification Search
CPC ............ C21C 1/08–105; C21C 7/0006; C21C 7/0037; C21C 1/10; C22C 37/04;
(Continued)

(56) References Cited

U.S. PATENT DOCUMENTS 3,527,597 A    9/1970  Dawson et al.
4,432,793 A *  2/1984  Hilaire ................. C22C 35/005
                                                    148/322

(Continued)

FOREIGN PATENT DOCUMENTS

CN    103484749 A  *  1/2014
CN    103484749 A     1/2014

(Continued)

OTHER PUBLICATIONS

International Search Report and Written Opinion for Corresponding International Application No. PCT/NO2017/050174 (9 Pages) (dated Oct. 27, 2017).

(Continued)

*Primary Examiner* — Brian D Walck
*Assistant Examiner* — Danielle Carda
(74) *Attorney, Agent, or Firm* — LUCAS & MERCANTI, LLP

(57) ABSTRACT

An inoculant for manufacturing cast iron with lamellar, compacted or spheroidal graphite is disclosed. The inoculant has a particulate ferrosilicon alloy having 40 and 80% by weight of silicon, 0.5-5 wt % of calcium and/or strontium and/or barium, 0-10 wt % of rare earths, 0-5 wt % of magnesium, less than 5% by weight of aluminium, 0-10 wt % of manganese and/or zirconium, and the balance being iron, wherein the inoculant additionally contains 0.1-10 wt % of particulate bismuth oxide particles and optionally 0.1-10 wt % of one or more particulate metal sulphides and/or one or more particulate iron oxides, where the (Continued)

particulate bismuth oxide is mixed or blended with the ferrosilicon particles, or is simultaneously added to cast iron together with the particulate ferrosilicon particles.

15 Claims, 2 Drawing Sheets

(51) Int. Cl.
  *C22C 38/02* (2006.01)
  *C22C 33/10* (2006.01)
  *C22C 33/08* (2006.01)
  *C22C 38/00* (2006.01)
  *C22C 33/06* (2006.01)
  *C22C 38/06* (2006.01)
  *C22C 28/00* (2006.01)
  *C22C 30/00* (2006.01)
  *C22C 37/04* (2006.01)

(52) U.S. Cl.
  CPC .............. *C22C 33/06* (2013.01); *C22C 33/08* (2013.01); *C22C 33/10* (2013.01); *C22C 37/04* (2013.01); *C22C 37/10* (2013.01); *C22C 38/002* (2013.01); *C22C 38/005* (2013.01); *C22C 38/02* (2013.01); *C22C 38/06* (2013.01)

(58) Field of Classification Search
  CPC ....... C22C 37/10; C22C 33/08; C22C 38/005; C22C 38/02; C22C 38/06
  USPC .......................................................... 75/316
  See application file for complete search history.

(56) References Cited

U.S. PATENT DOCUMENTS

| | | | |
|---|---|---|---|
| 5,733,502 | A | 3/1998 | Margaria et al. |
| 6,866,696 | B1 * | 3/2005 | Naro .............. C21C 1/00 75/232 |
| 11,098,383 | B2 * | 8/2021 | Knustad ............... C22C 33/08 |
| 11,479,828 | B2 * | 10/2022 | Ott ....................... C22C 28/00 |
| 11,486,012 | B2 * | 11/2022 | Ott ...................... C22C 38/002 |
| 2015/0284830 | A1 | 10/2015 | Fay et al. |
| 2016/0047008 | A1 | 2/2016 | Margaria et al. |
| 2020/0340069 | A1 * | 10/2020 | Ott .......................... C21C 1/105 |
| 2020/0399724 | A1 * | 12/2020 | Ott .......................... C21C 1/105 |
| 2020/0399726 | A1 * | 12/2020 | Ott .......................... C21C 1/105 |
| 2020/0407811 | A1 * | 12/2020 | Ott ......................... C22C 38/002 |

FOREIGN PATENT DOCUMENTS

| | | | |
|---|---|---|---|
| CN | 104561735 A | 4/2015 | |
| CN | 104561736 A | 4/2015 | |
| EP | 1126037 A1 | 8/2001 | |
| GB | 1296048 A | 11/1972 | |
| RU | 2497954 C1 | 11/2013 | |
| RU | 2521915 C1 | 7/2014 | |
| SU | 872563 A1 | 10/1981 | |
| WO | 9524508 A1 | 9/1995 | |
| WO | 9929911 A1 | 6/1999 | |
| WO | 2006068487 A1 | 6/2006 | |
| WO | WO-2006068487 A1 * | 6/2006 | ............. C22C 28/00 |

OTHER PUBLICATIONS

International Search Report and Written Opinion for Corresponding International Application No. PCT/NO2017/050175 (12 Pages)(dated Oct. 18, 2017).
International Preliminary Report on Patentability for Corresponding International Application No. PCT/NO2017/050174 (8 Pages) (dated Jul. 31, 2018).
Search Report for Norwegian Patent Application No. 20161094 (2 Pages) (dated Jan. 30, 2017).
Search Report for Norwegian Patent Application No. 20161091 (2 Pages) (dated Jan. 5, 2018).
Zhe et al., "Influence of cooling rate and antimony addition content on graphite morphology and mechanical properties of ductile iron", China Foundry, 2012, vol. 9. No. 2, pp. 114-118.
Glavas et al., "Effects of Antimony and Wall Thickness on Graphite Morphology in Ductile Iron Castings", Metal. Trans. B, 2016, vol. 47, No. 4, pp. 2487-2497.
Horie et al., "Effects of bismuth on nodule count in spheroidal graphite iron castings with thin section", Imono, 1988, vol. 60, No. 3 pp. 173-178. English abstract.
Search Report dated Jul. 11, 2019 for Russian Patent Application No. 2019102394/02 (004196) (English translation only).

* cited by examiner

CAST IRON INOCULANT AND METHOD FOR PRODUCTION OF CAST IRON INOCULANT

CROSS REFERENCE TO RELATED APPLICATION

This Application is a 371 of PCT/NO2017/050174 filed on Jun. 29, 2017 which, in turn, claimed the priority of Norwegian Patent Application No. 20161094 filed on Jun. 30, 2016, both applications are incorporated herein by reference.

TECHNICAL FIELD

The present invention relates to a ferrosilicon based inoculant for the manufacture of cast iron with lamellar, compacted or spheroidal graphite and to a method for production of the inoculant.

BACKGROUND ART

Cast iron is typically produced in cupola or induction furnaces, and generally contain between 2 to 4 percent carbon. The carbon is intimately mixed with the iron and the form which the carbon takes in the solidified cast iron is very important to the characteristics and properties of the iron castings. If the carbon takes the form of iron carbide, then the cast iron is referred to as white cast iron and has the physical characteristics of being hard and brittle, which in certain applications is undesirable. If the carbon takes the form of graphite, the cast iron is soft and machinable and is referred to as grey cast iron.

Graphite may occur in cast iron in the lamellar, compacted or spheroidal forms and variations thereof. The spheroidal shape produces the highest strength and most ductile type of cast iron.

The shape, size and nodule number density (number of nodules per $mm^2$) the graphite takes, as well as the amount of graphite versus iron carbide, can be controlled by certain additives that promote the formation of graphite during solidification of cast iron. These additives are referred to as inoculants and their addition to the cast iron as inoculation.

In casting iron products from liquid iron, there will always be a risk for the formation of iron carbides in thin sections of castings. The formation of iron carbide is brought about by the rapid cooling of the thin sections as compared to the slower cooling of the thicker sections of the casting. The formation of iron carbide in a casting is referred to in the trade as "chill". The formation of chill is quantified by measuring "chill depth" and the power of an inoculant to prevent chill and reduce chill depth is a convenient way in which to measure and compare the power of inoculants.

In cast iron containing spheroidal graphite the power of inoculants is also commonly measured by the number density per unit area of spheroidal graphite particles in the as-cast condition. A higher number density per unit area of graphite spheroids means that the power of inoculation or graphite nucleation has been improved.

There is a constant need to find inoculants which reduce chill depth and improve the machinability of grey cast irons as well as increase the number density of graphite spheroids in ductile cast irons.

Since the exact chemistry and mechanism of inoculation and why inoculants function as they do is not completely understood, a great deal of research goes into providing the industry with new and improved inoculants.

It is thought that calcium and certain other elements suppress the formation of iron carbide and promote the formation of graphite. A majority of inoculants contain calcium. The addition of these iron carbide suppressants is usually facilitated by the addition of a ferrosilicon alloy and probably the most widely used ferrosilicon alloys are the high silicon alloys containing 70 to 80% silicon and the low silicon alloy containing 45 to 55% silicon.

U.S. Pat. No. 3,527,597 discovered that good inoculating power is obtained with the addition of between about 0.1 to 10% strontium to a silicon-bearing inoculant which contains less than about 0.35% calcium and up to 5% aluminium.

It is further known that if barium is used in conjunction with calcium the two act together to give a greater reduction in chill than an equivalent amount of calcium.

The suppression of carbide formation is associated by the nucleating properties of the inoculant. By nucleating properties it is understood the number of nuclei formed by an inoculant. A high number of nuclei formed results in an increased graphite nodule number density and thus improves the inoculation effectiveness and improves the carbide suppression. Further a high nucleation rate may also give better resistance to fading of the inoculating effect during prolonged holding time of the molten iron after inoculation.

U.S. Pat. No. 4,432,793 discloses an inoculant containing bismuth, lead and/or antimony, sold under trademark Spherix® Inoculant. Bismuth, lead and/or antimony are known to have high inoculating power and to provide an increase in the number of nuclei. These elements are also known to be anti-spheroidizing elements, and the increasing presence of these elements in cast iron is known to cause degeneration of the spheroidal graphite structure of graphite. Spherix® is a ferrosilicon alloy containing from 0.005% to 3% rare earths and from 0.005% to 3% of one of the metallic elements bismuth, lead and/or antimony.

According to U.S. Pat. No. 5,733,502 Spherix® type inoculants always contain some calcium which improves the bismuth, lead and/or antimony yield at the time the alloy is produced and helping to distribute these elements homogeneously within the alloy, as these elements exhibit poor solubility in the iron-silicon phases. However, during storage the product tends to disintegrate and the granulometry tends toward an increased amount of fines. The reduction of granulometry was linked to the disintegration, caused by atmospheric moisture, of a calcium-bismuth phase collected at the grain boundaries of the inoculants. In U.S. Pat. No. 5,733,502 it was found that the binary bismuth-magnesium phases, as well as the ternary bismuth-magnesium-calcium phases, were not attacked by water. This result was only achieved for high silicon ferrosilicon alloy inoculants, for low silicon FeSi inoculants the product disintegrated during storage. The ferrosilicon-based ferroalloy for inoculation according to U.S. Pat. No. 5,733,502 thus contains (by weight %) from 0.005-3% rare earths, 0.005-3% bismuth, lead and/or antimony, 0.3-3% calcium and 0.3-3% magnesium, wherein the Si/Fe ratio is greater than 2.

In the Spherix® type inoculants and the inoculant described in U.S. Pat. No. 5,733,502 bismuth metal is alloyed with the ferrosilicon based inoculant. Bismuth has, as stated above, poor solubility in ferrosilicon alloys. The yield of added bismuth metal to the molten ferrosilicon is thus low and thereby increases the cost of the bismuth-containing inoculant. Further, due to the high density of elemental bismuth it may be difficult to obtain a homogeneous alloy during casting and solidification. Another difficulty is the volatile nature of bismuth metal due to the low melting temperature compared to the other elements in the FeSi based inoculant. Therefore, preparing FeSi based inoculant alloys containing bismuth is rather complicated and costly.

From WO 95/24508 it is known a cast iron inoculant showing an increased nucleation rate. This inoculant is a ferrosilicon based inoculant containing calcium and/or strontium and/or barium, less than 4% aluminium and between 0.5 and 10% oxygen in the form of one or more metal oxides. It was, however found that the reproducibility of the number of nuclei formed using the inoculant according to WO 95/24508 was rather low. In some instances a high number of nuclei are formed in the cast iron, but in other instances the number of nuclei formed are rather low. The inoculant according to WO 95/24508 has for the above reason found little use in practice.

From WO 99/29911 it is known known that the addition of sulphur to the inoculant of WO 95/24508 has a positive effect in the inoculation of cast iron and increases the reproducibility of nuclei.

In WO 95/24508 and WO 99/29911 iron oxides, FeO, $Fe_2O_3$ and $Fe_3O_4$, are the preferred metal oxides. Other metal oxides mentioned in these patent applications are $SiO_2$, MnO, MgO, CaO, $Al_2O_3$, $TiO_2$ and $CaSiO_3$, $CeO_2$, $ZrO_2$.

It is an object of the invention to provide a FeSi based inoculant containing bismuth without the above disadvantages. Another object of the invention is to provide a FeSi based inoculant having a high bismuth yield in the production of the inoculant compared to the inoculants of the prior art, and is not prone to disintegration whatever the Fe/Si ratio is. Yet another objective is to deliberately introduce a controlled amount of oxygen with the inoculant in the form of $Bi_2O_3$. These and other advantages with the present invention will become evident in the following description.

DISCLOSURE OF INVENTION

It has now been found that the addition of bismuth oxide to the inoculant of WO 99/29911 surprisingly results in a significantly higher number of nuclei or nodule number density in cast irons when adding the inoculant containing bismuth oxide to cast iron.

According to a first aspect the present invention relates to an inoculant for the manufacture of cast iron with lamellar, compacted or spheroidal graphite wherein said inoculant comprises a particulate ferrosilicon alloy comprising between 40 and 80% by weight of silicon, between 0.5 and 5% by weight of calcium and/or strontium and/or barium, between 0 and 10% by weight of rare earths, for example cerium and/or lanthanum, between 0 and 5% by weight of magnesium, up to 5% by weight of aluminium, between 0 and 10% by weight of manganese and/or zirconium and/or titanium, the balance being iron and incidental impurities in the ordinary amount, wherein said inoculant additionally comprises 0.1 to 10% by weight, based on the total weight of inoculant, of bismuth oxide particles and optionally between 0.1 and 10% by weight, based on the total weight of inoculant, of one or more particulate metal sulphides and/or iron oxide particles, where said bismuth oxide is in particulate form and is mixed with the ferrosilicon particles, or are simultaneously added to cast iron together with the particulate ferrosilicon alloy particles.

According to a first embodiment the ferrosilicon alloy comprises between 45 and 60% by weight of silicon.

According to a second embodiment the ferrosilicon alloy comprises between 60 and 80% by weight of silicon.

According to a third embodiment the ferrosilicon alloy comprises between 0.5 and 3% by weight of calcium and/or strontium and/or barium.

According to a fourth embodiment the ferrosilicon alloy comprises between 0.5 and 5% by weight aluminium.

According to a fifth embodiment the ferrosilicon alloy comprises up to 6% by weight of rare earths. In an embodiment the rare earths are cerium and/or lanthanum.

According to a sixth embodiment the ferrosilicon alloy comprises up to 6% by weight of manganese and/or zirconium and/or titanium.

According to a seventh embodiment the inoculant comprises 0.2 to 5% by weight, based on the total weight of inoculant, of particulate bismuth oxide. The inoculant according to the present invention may comprise 0.5 to 3.5% by weight, based on the total weight of inoculant, of particulate bismuth oxide.

According to an eight embodiment, the inoculant is in the form of a mixture of the particulate ferrosilicon based alloy, the particulate bismuth oxide and optionally the particulate metal sulphide and/or particulate iron oxide.

According to a ninth embodiment the inoculant is in the form of an agglomerated mixture of the particulate ferrosilicon based alloy and the particulate bismuth oxide and optionally the particulate metal sulphide and/or the particulate iron oxide.

According to a tenth embodiment the inoculant is in the form of briquettes made from a mixture of the particulate ferrosilicon based alloy and the particulate bismuth oxide and optionally the particulate metal sulphide and/or the particulate iron oxide.

According to an eleventh embodiment the particulate ferrosilicon alloy and the particulate bismuth oxide and optionally the particulate metal sulphide and/or the particulate iron oxide are added separately but simultaneously to the cast iron.

According to a twelfth embodiment the inoculant comprises between 0.1 and 5, e.g. between 0.5 to 3% by weight, based on the total weight of inoculant, of one or more metal sulphides and/or iron oxides. In a thirteenth embodiment the inoculant does not comprise a metal sulphide or iron oxide.

According to a fourteenth embodiment the ferrosilicon alloy comprises less than 1% by weight of magnesium. The magnesium may be present only as an incidental impurity element in the FeSi base alloy.

It has surprisingly been found that the inoculant according to the present invention containing bismuth oxide results in an increased nodule number density when the inoculant is added to cast iron, thus obtaining an improved suppression of iron carbide formation using the same amount of the inoculant according to the present invention as with conventional inoculants, or obtaining the same iron carbide suppression using less inoculant according to the present invention than when using conventional inoculants.

According to a second aspect, the present invention relates to a method for producing an inoculant for the manufacture of cast iron with lamellar, compacted or spheroidal graphite, comprising: providing a particulate base alloy comprising 40 to 80% by weight of silicon, between 0.5 and 5% by weight of calcium and/or strontium and/or barium, between 0 and 10% by weight of rare earths, for example cerium and/or lanthanum, between 0 and 5% by weight of magnesium, up to 5% by weight of aluminium, between 0 and 10% by weight of manganese and/or titanium and/or zirconium, the balance being iron and incidental impurities in the ordinary amount, and mixing with said particulate base alloy 0.1 to 10% by weight, based on the total weight of inoculant, of bismuth oxide and optionally between 0.1 to 10% by weight, based on the total weight of inoculant, sulphur in the form of one or more metal sulphides and/or one or more iron oxides to produce said inoculant.

According to one embodiment of the method the particulate bismuth oxide and optionally the particulate metal sulphides and/or particulate iron oxide are mixed with the particulate FeSi base alloy by mechanical mixing or blending.

According to another embodiment of the method the particulate bismuth oxide, and optionally the particulate metal sulphides and/or particulate iron oxide are mixed with the FeSi base alloy by mechanical mixing or blending followed by agglomeration of powder mixtures by pressing with a binder, preferably sodium silicate solution. The agglomerates are subsequently crushed and screened to the required final product sizing. Agglomeration of the powder mixtures will ensure that segregation of the added bismuth oxide powder, and optionally the added particulate metal oxide and particulate metal sulphide are eliminated.

According to a third embodiment of the method, the particulate bismuth oxide and optionally the particulate metal sulphides and/or particulate iron oxide are added to liquid cast iron simultaneously with the particulate FeSi base alloy.

According to a fourth embodiment of the method the FeSi base alloy comprises between 45 and 60% by weight of silicon.

According to a fifth embodiment of the method the FeSi base alloy comprises between 60 and 80% by weight of silicon.

According to a sixth embodiment of the method the FeSi base alloy comprises between 0.5 and 3% by weight of calcium and/or strontium and/or barium.

According to a seventh embodiment of the method the FeSi base alloy comprises between 0.5 and 5% by weight aluminium.

According to an eight embodiment of the method the FeSi base alloy comprises up to 6% by weight of rare earths. In an embodiment of the method the rare earths are cerium and/or lanthanum.

According to a ninth embodiment of the method the FeSi base alloy comprises up to 6% by weight of manganese and/or titanium and/or zirconium.

According to a tenth embodiment of the method the inoculant contains 0.2 to 5% by weight, based on the total weight of inoculant, of particulate bismuth oxide. The inoculant according to the present invention may e.g. comprise 0.5 to 3.5% by weight, based on the total weight of inoculant, of particulate bismuth oxide.

According to an eleventh embodiment the inoculant comprises between 0.1 and 5, e.g. between 0.5 to 3% by weight, based on the total weight of inoculant, of one or more metal sulphides and/or iron oxides. In a twelfth embodiment the inoculant does not comprise a metal sulphide or iron oxide.

According to a thirteenth embodiment the ferrosilicon alloy comprises less than 1% by weight of magnesium. The magnesium may be present only as an incidental impurity element in the FeSi base alloy.

DETAILED DESCRIPTION OF THE INVENTION

In the manufacturing process for producing cast iron with spheroidal graphite the cast iron melt is normally nodularisation treated, conventionally using an Mg—FeSi alloy, prior to the inoculation treatment. The nodularisation treatment has the objective to change the form of the graphite from flake to nodule when it is precipitating and subsequently growing. The way this is done is by changing the interface energy of the interface graphite/melt. It is known that Mg and Ce are elements that change the interface energy, Mg being more effective than Ce. When Mg is added to a base iron melt, it will first react with oxygen and sulphur. It is only the "free magnesium" that will have a nodularising effect. The nodularisation reaction results in agitation, is violent and generates slag floating on the surface. The violence of the reaction will result in most of the nucleation sites for graphite that were already in the melt (introduced by the raw materials) and other inclusions being part of the slag on the top and removed. However some MgO and MgS inlcusions produced during the nodularisation treatment will still be in the melt. These inclusions are not good nucleation sites as such.

The primary function of inoculation is to prevent carbide formation by introducing nucleation sites for graphite. In addition to introducing nucleation sites the inoculation also transform the MgO and MgS inclusions formed during the nodularisation treatment into nucleation sites by adding a layer (with Ca, Ba or Sr) on the inclusions.

In accordance with the present invention, the particulate FeSi base alloys should comprise from 40 to 80% by weight Si. The FeSi base alloy may be a high silicon alloy containing 60 to 80% silicon or a low silicon alloy containing 45 to 60% silicon. The FeSi base alloy should have a particle size lying within the conventional range for inoculants, e.g. between 0.2 to 6 mm.

In accordance with the invention, the particulate FeSi based alloy comprises between 0.5 and 5% by weight of Ca and/or Sr and/or Ba. Using a higher amount of Ca, Ba and/or Sr may reduce the performance of the inoculant, increase slag formation and increase the cost. The amount of Ca and/or Sr and/or Ba in the FeSi base alloy may e.g. be 0.5-3% by weight.

The FeSi base alloy comprises up to 10% by weight of rare earths (RE). RE may for example be Ce and/or La. Good inoculating performance is also achieved when the amount of RE is up to 6% by weight. The amount of RE should preferably be at least 0.1% by weight. Preferably the RE is Ce and/or La.

Figure 3A:
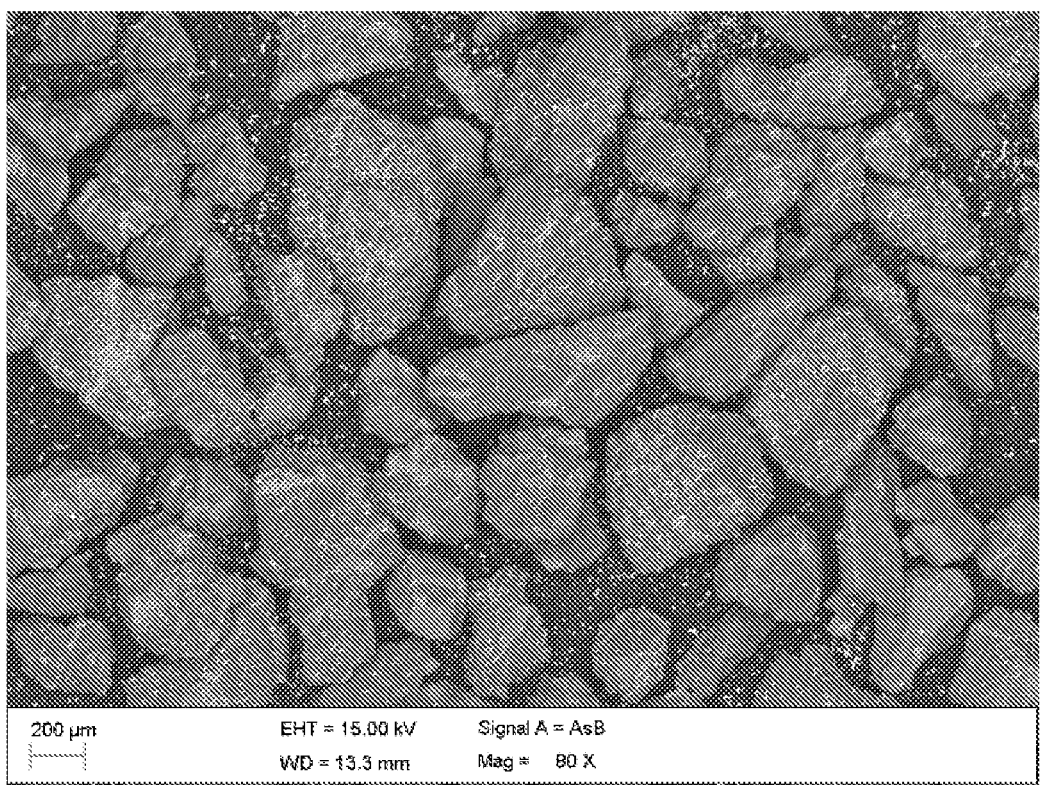
FIG. 3*a-b* show SEM photos of the inoculant according to the present invention; FeSi coated with $Bi_2O_3$ powder. $Bi_2O_3$ is visible as white particles.
Figure 3B:
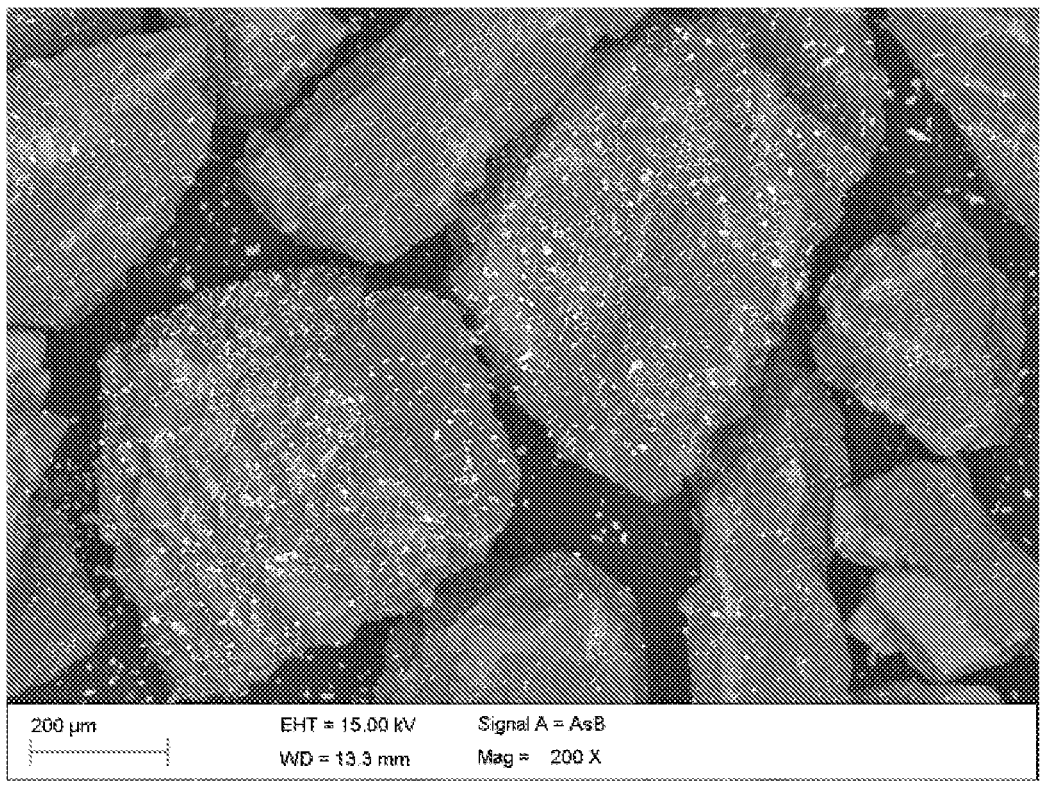

The presence of small amounts of elements like Bi in the melt (also called subversive elements) will prevent magnesium having the desired nodularising effect. This negative effect can be neutralized by using Ce. Introducing $Bi_2O_3$ together with the inoculant is adding a reactant to an already existing system with Mg inclusions floating around in the melt and "free" Mg. This is not a violent reaction and the Bi yield ($Bi/Bi_2O_3$ remaining in the melt) is expected to be high. Good inoculating effect is also observed when the inoculant contains 0.2 to 5% by weight, based on the total weight of inoculant, of particulate $Bi_2O_3$. The amount of particulate $Bi_2O_3$ may in some embodiments e.g. be from about 0.5 to about 3.5% by weight, based on the total weight of inoculant The $Bi_2O_3$ particles should have a small particle size, i.e. micron size (e.g. 1-10 μm), resulting in very quick melting or dissolution of the $Bi_2O_3$ particles when introduced in the cast iron melt. Advantageously, the $Bi_2O_3$ particles are mixed with the particulate FeSi base alloy prior to adding the inoculant into the cast iron melt. FIG. 3 shows an inoculant according to the present invention where $Bi_2O_3$ particles are mixed with FeSi alloy particles. The $Bi_2O_3$ particles are visible as white particles. Mixing the $Bi_2O_3$ particles with the FeSi base alloy particles results in a stable, homogeneous inoculant. The following Examples show that the addition of $Bi_2O_3$ particles together with FeSi base alloy particles results in an increased nodule number density when the inoculant is added to cast iron, thus reducing the amount of inoculant necessary to achieve the desired inoculating effect.

EXAMPLES

Two cast iron melts P and Q were treated with 1.05 wt % MgFeSi nodularizing alloy based on the weight of the cast irons in a tundish cover ladle. The MgFeSi nodularizing alloy had the following composition by weight: 5.8% Mg, 1% Ca, 1% RE, 0.7% Al, 46% Si, balance being iron.

The Mg treated cast iron melts P and Q were inoculated with a ferrosilicon Inoculant A containing 71.8 wt % Si, 1.07 wt % Al, 0.97 wt % Ca, 1.63 wt % Ce, the remaining being iron and incidental impurities in the ordinary amount. Different amounts of bismuth oxide in particulate form, iron sulphide in particulate form and iron oxide in particulate form were added to Inoculant A and mechanically mixed using to obtain homogenous mixtures of the different inoculants.

For comparison purposes the same cast iron melts were inoculated with Inoculant A to which were added only iron oxide and/or iron sulphides (prior art).

The chemical composition of the final cast irons were 3.5-3.7 wt % C, 2.3-2.5 wt % Si, 0.29-0.30 wt % Mn, 0.009-0.011 wt % S, 0.040-0.050 wt % Mg.

The added amounts of bismuth oxide, iron oxide and iron sulphide to the FeSi base alloy are shown in Table 1. The amounts of bismuth oxide, iron oxide and iron sulphide are based on the total weight of the inoculants.

TABLE 1

Inoculant mixtures based on Inoculant A and various additions by weight % of $Bi_2O_3$, FeS and $Fe_2O_3$.

| | | Base inoculant | FeS | $Fe_2O_3$ | $Bi_2O_3$ | Reference |
|---|---|---|---|---|---|---|
| Melt P | 1 | Inoculant A | 1% | 2% | — | P1 (prior art) |
| | 2 | Inoculant A | — | — | 1.1% | P2 (Invention) |
| | 3 | Inoculant A | 1% | 2% | 1.1% | P3 (Invention) |
| | 4 | Inoculant A | 1% | 2% | — | P4 (prior art) |
| Melt Q | 1 | Inoculant A | — | — | 2.2% | Q1 (Invention) |
| | 2 | Inoculant A | 1% | — | 1.1% | Q2 (Invention) |
| | 3 | Inoculant A | 1% | 2% | — | Q3 (prior art) |
| | 4 | Inoculant A | 1% | 2% | — | Q4 (prior art) |
| | 5 | Inoculant A | 1% | — | 2.2% | Q5 (Invention) |
| | 6 | Inoculant A | 1% | 2% | 1.1% | Q6 (Invention) |

Figure 1:
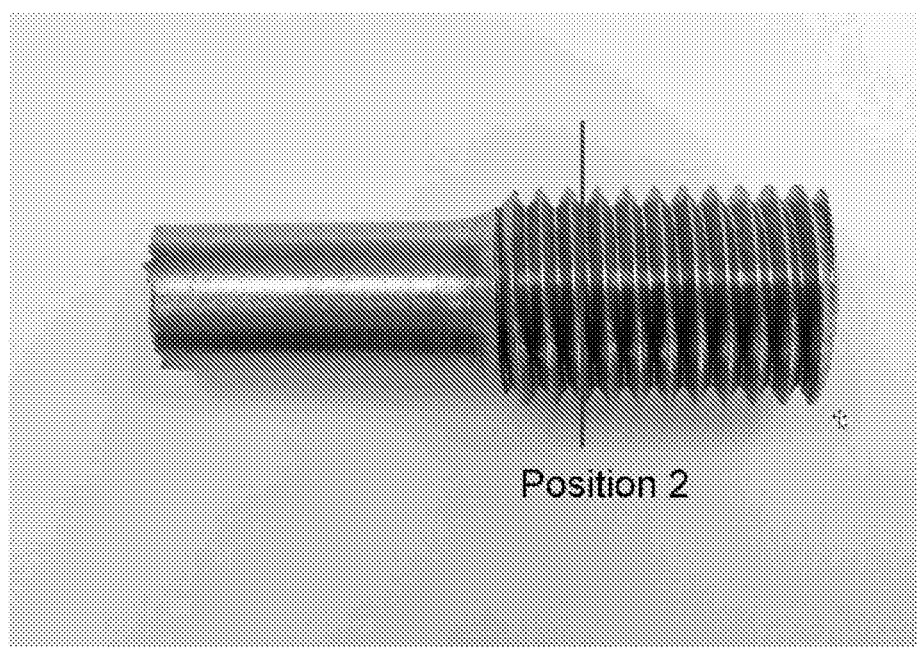
FIG. 1 shows a test bar for cast irons.

The different inoculants were added to cast iron melts P and Q in an amount of 0.2 wt %. The inoculated cast irons were cast into 28 mm diameter cylindrical test bar samples. Microstructures were examined in one test bar from each trial. The test bars were cut, prepared and evaluated by image analysis in position 2 shown in FIG. 1. Nodule number density (number of nodules/$mm^2$) was determined. The results are shown in FIG. 2.

Figure 2:
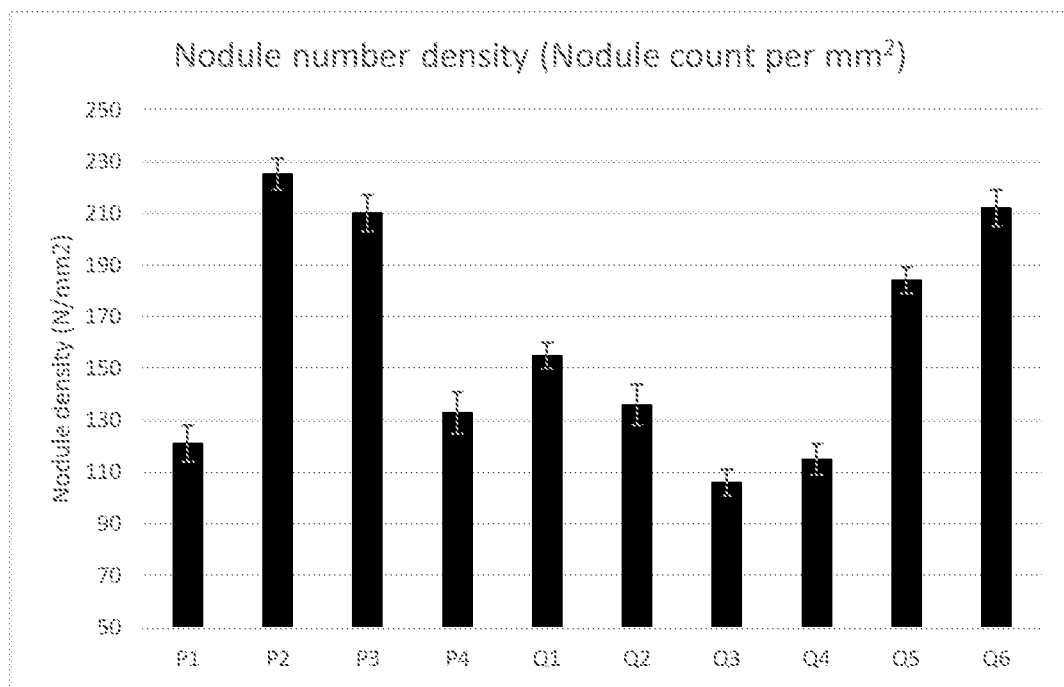
FIG. 2 is a diagram showing nodule number density in cast iron samples.

As can be seen from FIG. 2 the results show a very significant trend in that the cast irons treated with $Bi_2O_3$ containing inoculants, P2, P3, Q1, Q2, Q5 and Q6, according to the invention, show higher nodule number density compared to cast iron melts treated with the prior art inoculants, P1, P4, Q3, Q4.

Having described preferred embodiments of the invention it will be apparent to those skilled in the art that other embodiments incorporating the concepts may be used. These and other examples of the invention illustrated above and in the accompanying drawings are intended by way of example only and the actual scope of the invention is to be determined from the following claims.

The invention claimed is:

1. An inoculant for the manufacture of cast iron with lamellar, compacted or spheroidal graphite consisting of:
   a particulate ferrosilicon alloy consisting of:
   40-80 wt % of silicon,
   0.5-5 wt % of calcium,
   0.1-10 wt % of rare earths,
   0.5-5 wt % of aluminum,
   the balance being iron and incidental impurities in the ordinary amount, and
   0.1-2.2 wt % of particulate bismuth oxide, based on the total weight of inoculant,
   wherein said ferrosilicon alloy particles are coated with the particulate bismuth oxide.

2. The inoculant according to claim 1, wherein the silicon in the particulate ferrosilicon alloy is between 45 and 60 wt %.

3. The inoculant according to claim 1, wherein the silicon in the particulate ferrosilicon alloy is between 60 and 80 wt %.

4. The inoculant according to claim 1, wherein the calcium in the particulate ferrosilicon alloy is between 0.5 and 3 wt %.

5. The inoculant according to claim 1, wherein the rare earths in the particulate ferrosilicon alloy is 0.1-6 wt %.

6. The inoculant according to claim 1, wherein the particulate bismuth oxide in the inoculant is 0.2 to 2.2 wt %.

7. The inoculant according to claim 1, wherein the rare earths are cerium and/or lanthanum.

8. The inoculant according to claim 1, wherein the inoculant is in the form of a blend or mixture of the particulate ferrosilicon alloy and the particulate bismuth oxide.

9. The inoculant according to claim 1, wherein the inoculant is in the form of agglomerates made from a mixture of the particulate ferrosilicon alloy and the particulate bismuth oxide.

10. The inoculant according to claim 1, wherein the inoculant is in the form of briquettes made from a mixture of the particulate ferrosilicon alloy and the particulate bismuth oxide.

11. The inoculant according to claim 1, wherein the rare earths are cerium, lanthanum, or a combination thereof.

12. An inoculant for the manufacture of cast iron with lamellar, compacted or spheroidal graphite, said inoculant consisting of
   a particulate ferrosilicon alloy consisting of:
   40-80 wt % of silicon,
   0.5-5 wt % of calcium,
   0.1-10 wt % of rare earths,
   0.5-5 wt % of aluminum, the balance being iron and incidental impurities in the ordinary amount, and 0.1-2.2 wt % of particulate bismuth oxide, based on the total weight of inoculant, wherein the particulate ferrosilicon alloy inoculant and the particulate bismuth oxide are added separately but simultaneously to liquid cast iron.

13. A method for producing the inoculant of claim 1 for the manufacture of cast iron with lamellar, compacted or spheroidal graphite, comprising:

providing the particulate ferrosilicon alloy consisting of 40-80 wt % of silicon, 0.5-5 wt % of calcium, 0.1-10 wt % rare earths, 0.5-5 wt % of aluminium, the balance being iron and incidental impurities in the ordinary amount, and mixing to or blending with said particulate ferrosilicon alloy 0.1-2.2 wt % of particulate bismuth oxide based on the total weight of inoculant to produce said inoculant.

14. The method according to claim 13, wherein the rare earths are cerium, lanthanum, or a combination thereof.

15. The inoculant according to claim 13, wherein said particulate bismuth oxide is simultaneously added to liquid cast iron with the particulate ferrosilicon particles, instead of mixing or blending with the ferrosilicon particles.

* * * * *